United States Patent [19]
Suzuki et al.

[11] Patent Number: 5,182,861
[45] Date of Patent: Feb. 2, 1993

[54] SHEET-DRIVEN TYPE AUTOMATIC DRAFTING MACHINE

[75] Inventors: Masaaki Suzuki; Tooru Eshita, both of Tokyo, Japan

[73] Assignee: Mutoh Industries Ltd., Tokyo, Japan

[21] Appl. No.: 853,994

[22] Filed: Mar. 19, 1992

Related U.S. Application Data

[63] Continuation-in-part of Ser. No. 545,896, Jun. 29, 1990, abandoned.

[30] Foreign Application Priority Data

Aug. 29, 1989 [JP] Japan .................................. 1-222623
Sep. 27, 1989 [JP] Japan .................................. 1-251563
Sep. 27, 1989 [JP] Japan .................................. 1-251564

[51] Int. Cl.⁵ .......................... B43L 13/00; B65H 5/20
[52] U.S. Cl. ..................................... 33/18.1; 33/1 M;
  33/32.4; 33/32.6; 271/171; 271/273; 400/636.1
[58] Field of Search ................... 33/1 M, 18.1, 18.2,
  33/32.3, 32.4, 32.5, 32.6, 32.7, 623; 271/265,
  272, 273, 274, 171; 346/134; 400/636.1, 636.3,
  639, 639.1

[56] References Cited

U.S. PATENT DOCUMENTS

| | | | |
|---|---|---|---|
| 3,241,665 | 3/1966 | Erk | 271/273 |
| 4,021,030 | 5/1977 | Fitche et al. | 271/265 |
| 4,603,987 | 8/1986 | Kuranishi et al. | 271/171 X |
| 4,647,239 | 3/1987 | Maezawa et al. | 400/639.1 X |
| 4,856,770 | 8/1989 | Farlotti | 271/274 |

FOREIGN PATENT DOCUMENTS

| | | | |
|---|---|---|---|
| 661963 | 4/1963 | Canada | 271/272 |
| 3030384 | 3/1982 | Fed. Rep. of Germany | 271/272 |
| 0761405 | 9/1980 | U.S.S.R. | 271/265 |

OTHER PUBLICATIONS

IBM Technical Disclosure Bulletin, vol. 22 No. 8A, Jan. 1980 "Motor Driven Fuser Roll Closure", p. 3116, Boumann, Chang, Clark.

Primary Examiner—William A. Cuchlinski, Jr.
Assistant Examiner—Alvin Wirthlin
Attorney, Agent, or Firm—Wenderoth, Lind & Ponack

[57] ABSTRACT

A sheet-driven type automatic drafting machine has a drive roller or rollers and a rotary drive mechanism connected to the drive roller or rollers, a Y-axis rail extending in the Y-axis direction above the drive roller or rollers, a line-drafting head movably mounted on the rail for movement along the rail and a head driver connected to the head for driving the head along the rail, a shaft positioned above the roller or rollers and parallel to said rail, a first press roller arm pivotally mounted on the shaft for pivoting around the shaft at a predetermined position thereon, a second press roller arm pivotally mounted on the shaft for pivoting around the shaft and for movement along the shaft, the press roller arms each having a press roller at one end thereof engagable with the drive roller or a corresponding drive roller when the press roller arms are pivoted toward the drive roller or rollers for pressing a drafting sheet therebetween and enabling the drafting sheet to be driven in an X-axis direction by the drive roller or rollers, an arm elevating device engaged with the arms for pivotally driving the arms for separating the press roller from the drive roller or rollers, a cursor movable along the Y-axis rail and driven by the head driver with the drafting head, and an arm drive engagement body on the cursor engagable with the second press roller arm for driving the second roller arm along the shaft in the Y-axis direction.

10 Claims, 10 Drawing Sheets

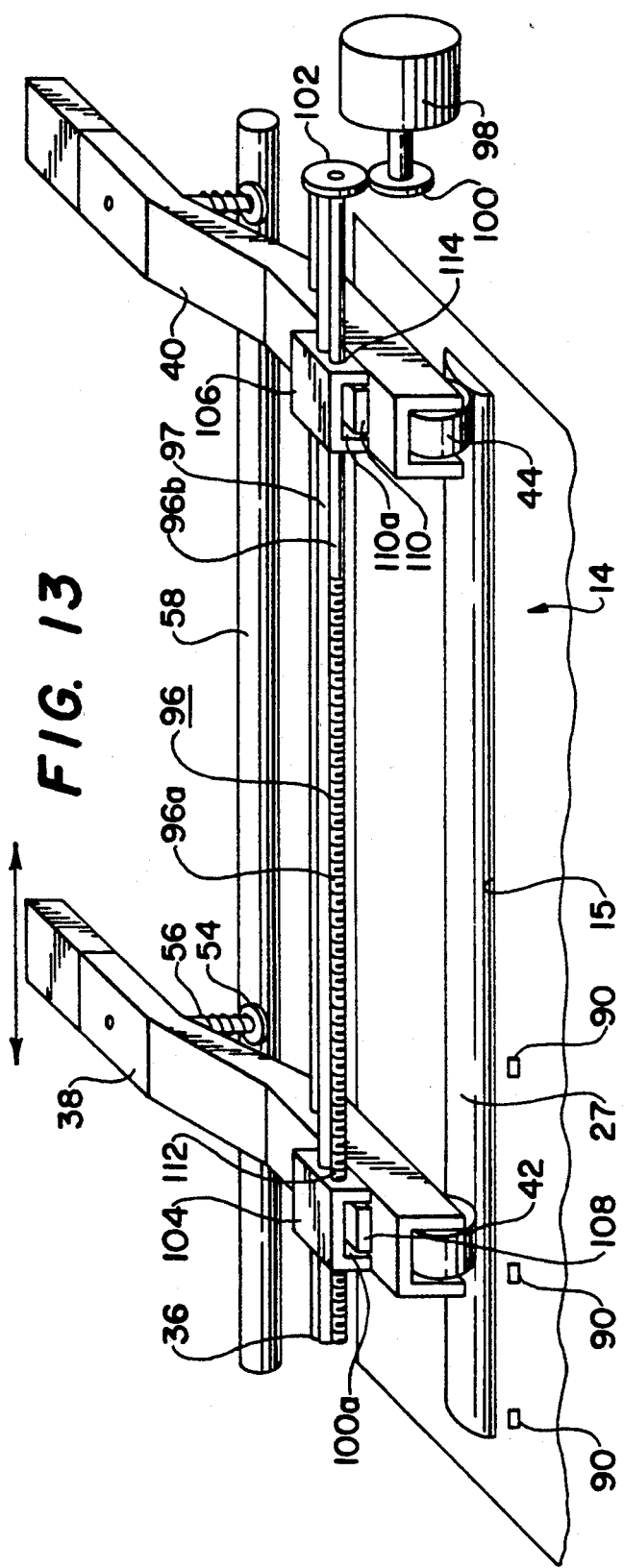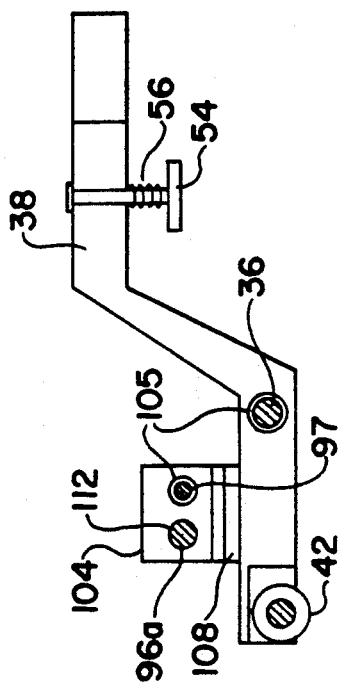

SHEET-DRIVEN TYPE AUTOMATIC DRAFTING MACHINE

This application is a continuation-in-part of application Ser. No. 07/545,896, filed Jun. 29, 1990 now abandoned.

BACKGROUND OF THE INVENTION

This invention relates to a sheet-driven type automatic drafting machine provided primarily with a drive roller, a press roller, and a line-drafting head, in which a paper sheet is nipped by these two rollers and then the sheet is sent along an X axis direction during a rotation of the drive roller, and the line-drafting head moves along a Y axis direction, in order to draft the desired drawing on the paper sheet on a sheet mounting member.

Conventionally, in a conventional sheet-driven type automatic drafting machine, the horizontal distance between two press rollers has been determined disadvantageously manually by an operator according to the width of the sheet of paper used so as to place both press rollers at both side portions of the sheet of paper.

In consequence, it is the first purpose of the present invention to provide a sheet-driven type automatic drafting machine provided with two press rollers, in which the horizontal distance between the two is automatically controlled.

According to a press roller supporting mechanism of the conventional sheet-driven type automatic drafting machine, a press roller arm 2 is supported so as to oscillate around a shaft 4 and is urged clockwise as shown in FIGS. 12A and 12B by means of a tension spring 6. Thus, the press roller 8 is resiliently pressed against the drive roller 10 due to the resilient force of the tension spring 6. When the press roller 8 is raised from the drive roller 10 so as to permit insertion of a sheet between the drive roller 10 and the press roller 8, an eccentric cam 12 rotates to a position at which a long radius or enlarged portion 12a of the eccentric cam 12 presses the press roller arm 2 at an arm portion between the tension spring 6 and the shaft 4 downwardly against the resilient force of the spring 6. Owing to the downward pressing force of the eccentric cam 12, the press roller arm 2 oscillates counterclockwise around the shaft 4 and as a result the roller 8 is separated from the drive roller 10 as shown in FIG. 12B.

According to the conventional construction of the press roller supporting mechanism, a large friction force is generated between the press roller arm 2 and the eccentric cam 12 due to the force of the tension spring 6 before the press roller rises. In consequence, when it is intended to move these press rollers to the most suitable positions according to the sheet size, a large load or force is needed to control and move the press roller arm 2 provided with a press roller 8, and the press roller arm fails to move smoothly. In this situation, it has been necessary to move and control the press roller arm exclusively by hand.

In consequence, it is another purpose of the present invention to provide a sheet-driven type automatic drafting machine have press roller arms which can be moved with light force, so that it is possible to control and move the press roller arm automatically.

BRIEF DESCRIPTION OF THE DRAWINGS

FIG. 13 is a perspective view of another embodiment; and

FIG. 14 is an end elevation view, partly in section, of the embodiment of FIG. 13.

DETAILED DESCRIPTION OF THE PREFERRED EMBODIMENT

Various embodiments of the present invention will be explained with reference to the accompanying drawings.

Figure 1:
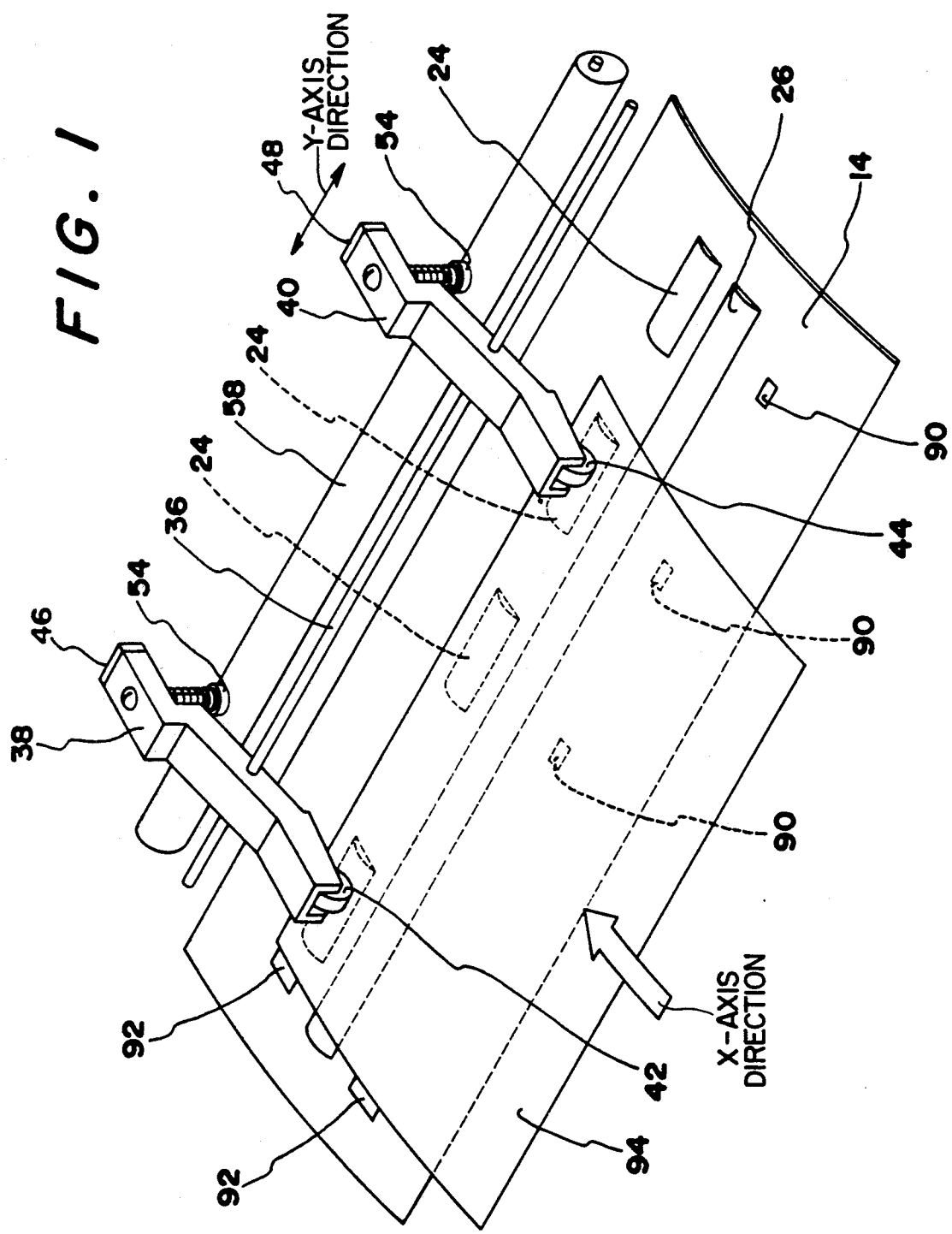
FIG. 1 is a perspective view of a part of the sheet-driven type automatic drafting machine according to the present invention.
Figure 2:
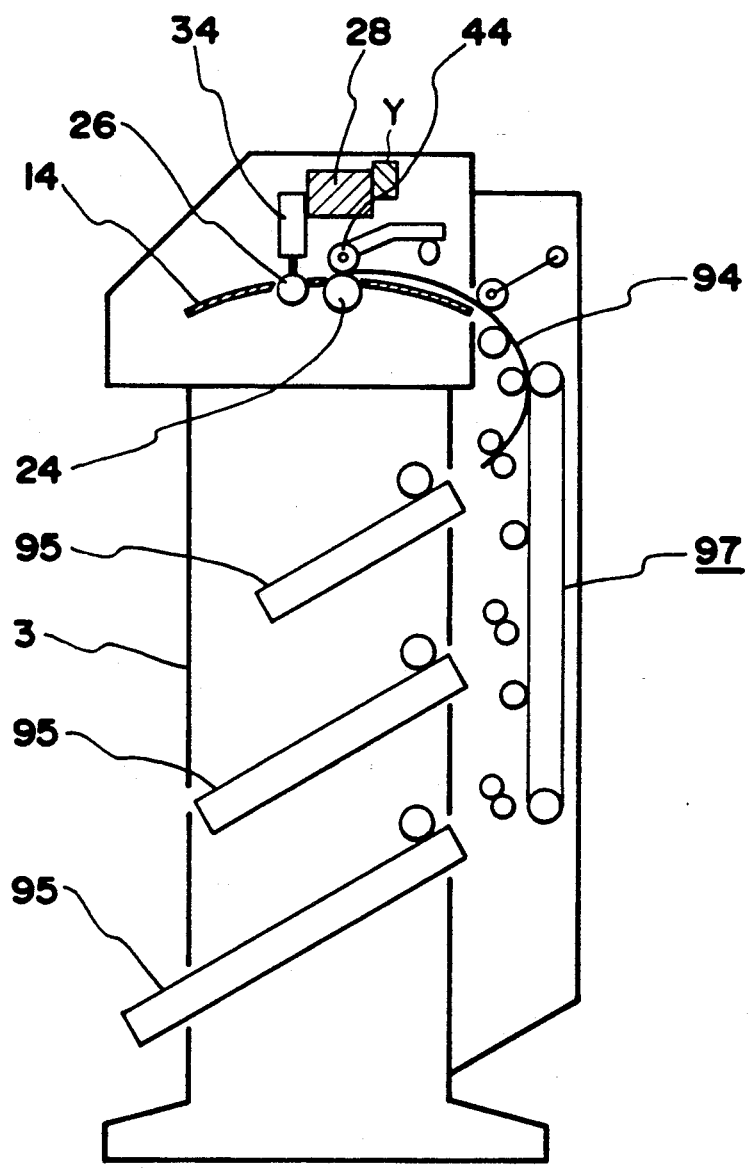
FIG. 2 is a side elevation of the machine including the part of FIG. 1.

First, as shown in FIGS. 1-4, a sheet mounting member 14 of the sheet-driven type automatic drafting machine of the present invention has opening means, which in this embodiment is in the form of a plurality of openings 16 and a thin or strip-like opening 18, respectively formed and arranged along the plane of the sheet mounting member 14. A pair of drive shafts 20 and 22 are arranged beneath these openings 16 and 18 and are connected to a rotary drive apparatus, not shown, and including an X-axis motor. A drive roller means in the form of a plurality of drive rollers 24 are secured to the drive shaft 20 and a drafting roller 26 is secured to the drive shaft 22. The drive rollers 24 and the drafting roller 26 are substantially identical in diameter and the X-axis motor drives these rollers 24 and 26 in the same direction at substantially identical peripheral speed to move drafting paper 94 in an X-axis direction when drafting is to be done. Over the sheet mounting member 14 shown in FIG. 3, a Y-axis rail, shown schematically, is installed and extends in a Y-axis direction perpendicular to the X-axis direction and a line-drafting head 28 is attached to the rail so as to move along the rail. Two belt pulleys (not shown) are rotatably mounted on both ends of the rail, an endless belt 30 for moving the line-drafting head runs around the belt pulleys (see FIG. 4), and the line-drafting head 28 is connected to the output shaft of a Y-axis drive motor (not shown). When the Y-axis drive motor is driven, the belt 30 runs and the line-drafting head 28 moves along the rail. The line-drafting head 28 has a writing or drawing instrument 34 removably mounted in a pen holder 32 connected to an elevator drive apparatus or elevator apparatus. A shaft 36 is placed parallel to the rail and a pair of press roller arms 38 and 40 are rotatably mounted on the shaft 36 at their middle portions. The first press roller arm 38 is stationary and prevented from moving along the shaft 36 and rotatably placed at a fixed position on the shaft 36. The second press roller arm 40 can slide along the shaft 36 on a slidable ball bearing fitted on the press roller arm 40. Respective press roller arms 38 and 40 have press rollers 42 and 44 mounted rotatably at respective ones of the ends of each press roller arm and have weights 46 and 48 mounted at the other of the ends of the press roller arm. These press roller arms 38 and 40 have respective through holes 50 formed at positions near the weights 46 and 48 and recesses facing downwardly and coinciding with the centers of the holes 50. Springs are installed within the recesses of the press roller arms 38 and 40. Bolt-like rods or shafts 52 loosely and slidably inserted through the holes 50 have heads 52a thereon and placed against the upper faces of the press roller arms 38 and 40 as clearly seen in FIG. 3. Contactors 54 constructed by flanged cylindrical bodies are secured to the lower ends of the bolt-like rods 52. Coil springs 56 are mounted on the rods 52 and compressed between the upper faces of the contactors 54 and the bottom faces of the recesses formed in the press roller arms 38 and 40. In consequence, the under faces of the heads 52a of the rods 52 contact under pressure the upper faces of the press roller arms 38 and 40. In this situation, a predetermined length of each shaft 52 extends downwardly from the lower face of the press roller arm due to the resilient force of the spring 56. The line drafting head 28 has an engagement portion 60 adapted to engage with the press roller arm 40. The eccentric cam rod 58 extends along the direction perpendicular to the plane of FIG. 3. An eccentric cam rod 58 is rotatably journaled to the machine frame at both ends of the eccentric cam rod 58 and one end of the cam rod 58 is connected to an output shaft of a motor 64 through a worm 61 and a worm wheel 62. The eccentric cam 58 as shown in section in FIG. 3, has a third eccentric sectional portion ③ used to press the press rollers 42 and 44 to the corresponding drive rollers 24 by means of the force of the springs 56, a second eccentric sectional portion ② used to allow these press rollers 42 and 44 to rise a little from the drive rollers 24 due to the weight of the press roller arm 38 or 40 itself, and a first eccentric sectional portion ① adapted to allow the press rollers 42 and 44 or the press roller arms 38 and 40 to raise off the rollers due to the weights 46 and 48 secured to the arms to their top positions. As shown in FIG. 1, the sheet mounting member 14 has a plurality of sheet width detecting sensors 90 at positions corresponding to the drive rollers 24. No detecting sensor 90 is provided on the sheet mounting member 14 at a position which corresponds to one drive roller 24, which roller the press roller 42 of the stationary press roller arm 38 contacts. Sheet restricting or positioning member 92 for making the edges of paper sheets 94 even are situated at the side portion of the sheet mounting member 14 at which the stationary press roller arm 38 is placed. It is apparent from FIG. 2 that the machine body 3 of the sheet-driven type automatic drafting machine includes a cassette containing space for removably storing sheet cassettes 95 containing paper sheets of different sizes. When an operation panel (not shown) installed on the machine body 3 is operated to actuate the set of sheet size selecting keys, the desired sheet cassette 95 is selected from the plurality of sheet cassettes 95, a sheet 94 contained in the cassette 95 selected is automatically sent to a position between the drive rollers 24 and the press rollers 42 and 44 by a well-known automatic sheet supply mechanism 97, and consequently the paper sheet 94 of the desired size is set or placed on the sheet mounting member 14. The operation panel is electrically connected to the controller so as to send the sheet width size signal or sheet cassette selection signal from the panel to the controller.

The construction of the automatic sheet supply mechanism is not explained since it is well known in this field.

It is possible to eliminate the automatic sheet supply apparatus or mechanism 97 and/or the sheet width detecting sensors 90 from the structure of the automatic drafting machine according to the present invention. In such a case, a command for moving the press roller arm 40 according to the sheet width or size is supplied from a host computer to the controller of the drafting machine.

Next, the operation of the automatic drafting machine will be explained with reference to the drawings.

Figure 3:
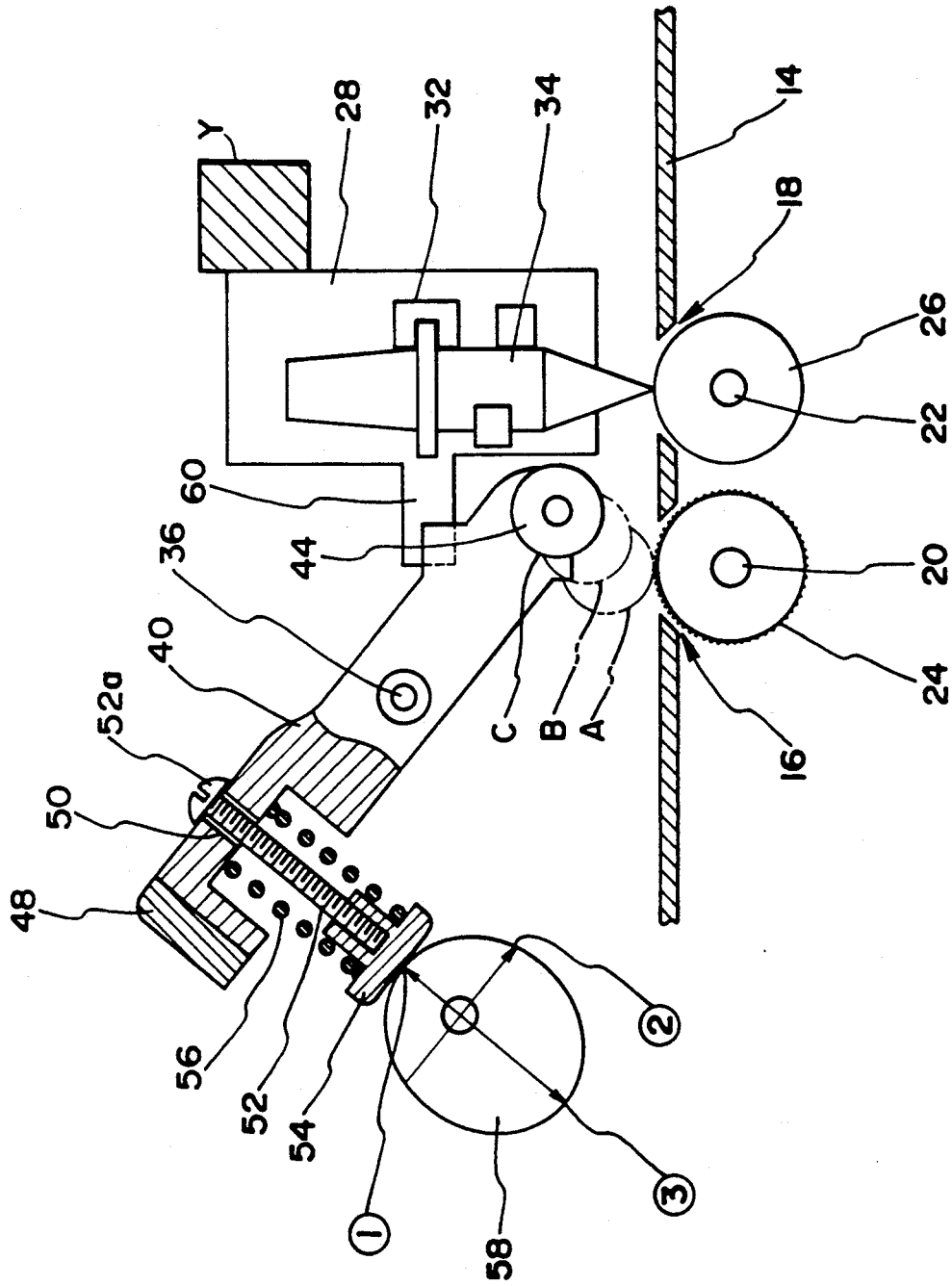
FIG. 3 is an enlarged partial sectional view of a part of the machine of FIG. 2.
Figure 4:
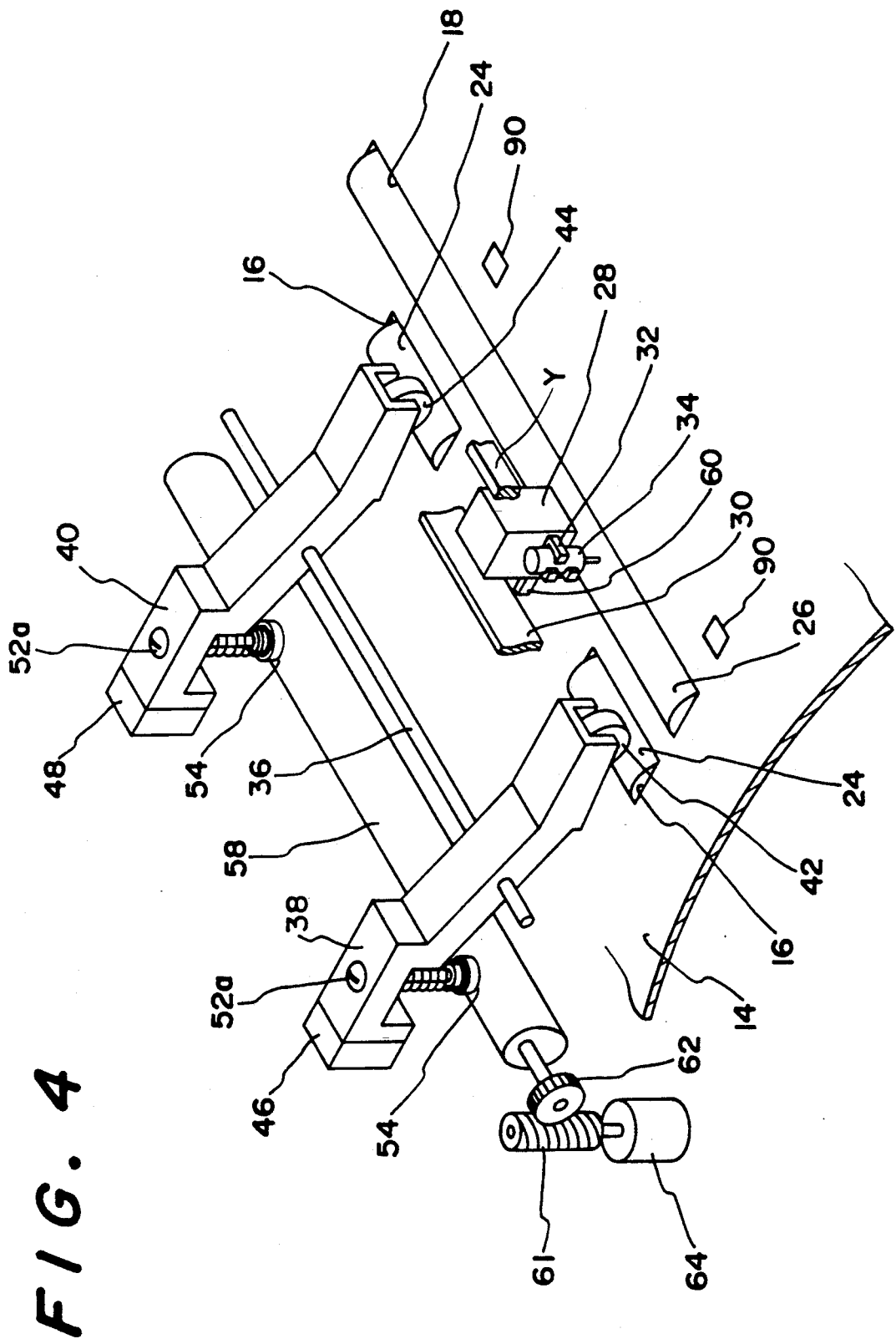
FIG. 4 is a perspective view of the important portion of the machine.
Figure 5:
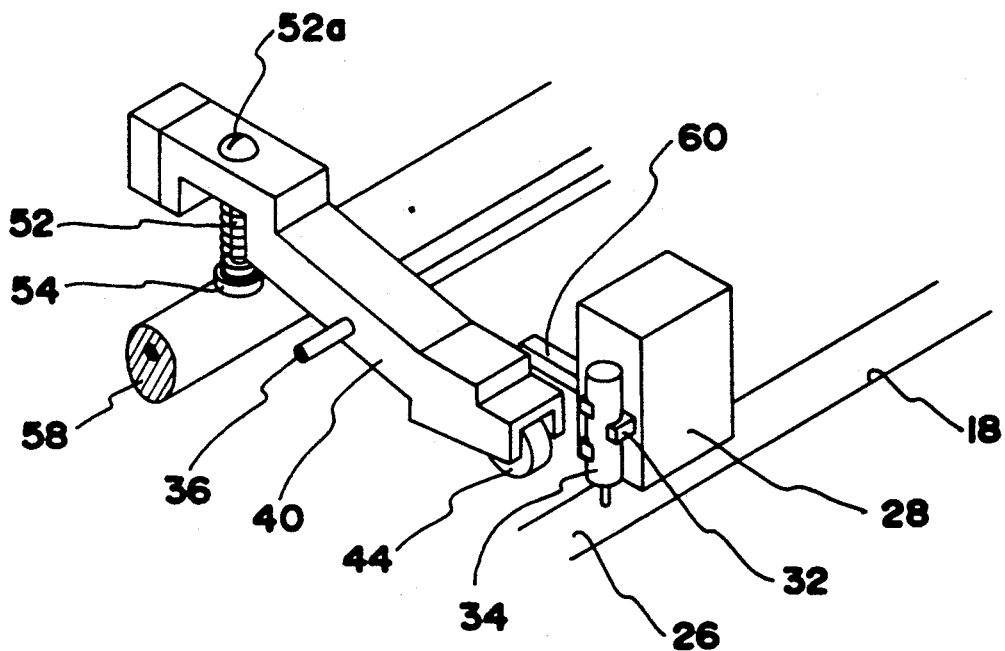
FIG. 5 is a perspective view of a part of the mechanism shown in FIG. 4.

When the motor 64 is driven, the eccentric cam 58 rotates so as to move the third eccentric sectional portion ③ from the position of FIG. 3 toward the flanged contactor 54, and the press roller arms 38 and 40 are raised by the rotating eccentric cam 58 through the flanged contactor 54 just before the third eccentric sectional portion ③ reaches the contactor 54.

In consequence, the press roller arms 38 and 40 rotate or oscillate clockwise, as shown in FIG. 3, around the shaft 36 and overcoming the effect of the weight 48, and the press rollers 42 and 44 move to the A position to contact the drive roller means in the form of the corresponding drive rollers 24. Furthermore, when the eccentric cam 58 rotates and the third eccentric sectional portion ③ comes near the contactor 54, the contactor 54 is raised by the cam surface portion just ahead of the third eccentric sectional portion of the eccentric cam 58 (see FIG. 3). In this situation, the press rollers 42 and 44 have contacted the drive rollers 24, so that the press roller arms 38 and 40 are prevented from rotating in the clockwise direction as shown in FIG. 3. As a result, the contactor 54 is raised against the resilient force of the spring 56, and the shaft 52 is raised through the hole 50. A pressure corresponding to the compressed resilient force of the coil spring 56 is applied to the press roller 42 or 44, pressing correspondingly the drive rollers 24. When the third eccentric sectional portion ③ of the eccentric cam 58 is positioned just under the contactor 54, the press rollers 42 and 44 resiliently press the drive rollers 24 under a predetermined pressure of the compressed resilient force of the coil spring 56. This position of the press roller 44 is shown by dotted line A in FIG. 3. When the eccentric cam 58 further rotates in order to move or rotate the second eccentric sectional portion ② toward the contactor 54, the compressed resilient force of the press rollers 42 and 44, which is applied to the drive rollers 24, is released just before the second eccentric sectional portion reaches the contactor 54. Consequently, the lower face of the head 52a retracts from its projected condition out of the upper surface of the press roller arm 40 as shown in FIG. 3. Then, the contactor 54 of the rod 52 contacts the cam surface of the eccentric cam 58, not due to the force of the spring 56, but due to the balancing weight of weights 46 and 48.

Figure 6A:
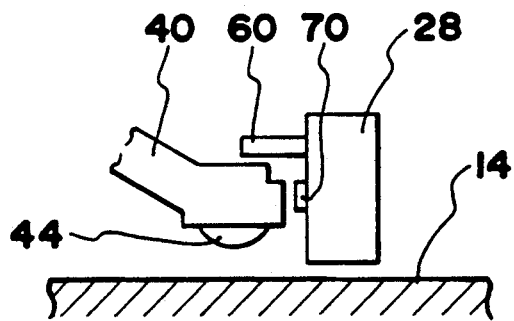
FIGS. 6(A) and 6(B) are elevations views for showing the operation of the mechanism shown in FIG. 5.
Figure 6B:
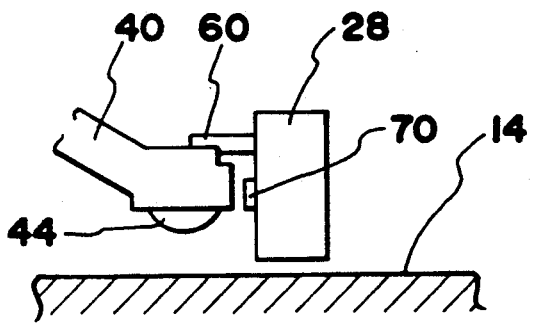
Figure 7:
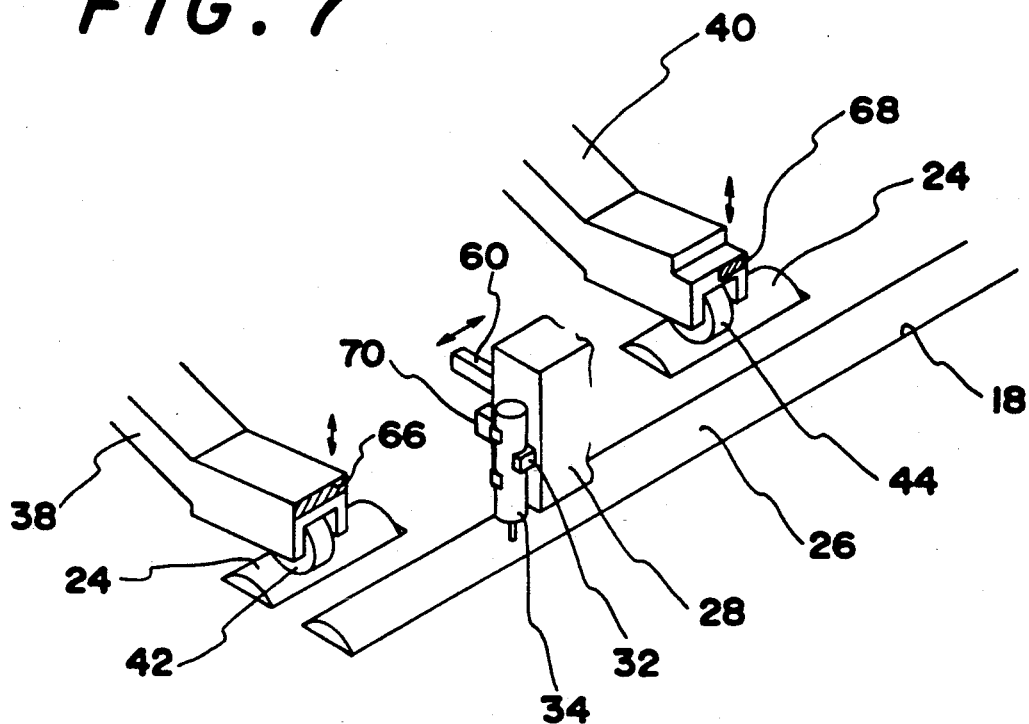
FIG. 7 is a perspective view of another part of the mechanism shown in FIG. 4.

When the eccentric cam 58 further rotates and the second eccentric sectional portion reaches the contactor 54, the contactor lowers due to the weight 48 according to decreasing eccentricity of the eccentric cam 58, so that the press rollers 42 and 44 are raised a little and separate from the drive rollers 24 as shown by B in FIG. 3. This raised position of the press rollers is called the regular up-position. When the eccentric cam further rotates and the first eccentric sectional portion (1) is moved to the position just under the contactor 54, the press roller arms 38 and 40 oscillate clockwise in FIG. 3 around the center of the shaft 36 due to the weights 46 and 48, and the press rollers 42 and 44 are raised to the uppermost position shown by C in FIG. 3. The situation called regular up-position in which the second eccentric sectional portion (2) is applied to the contactor 54 and the press roller 44 is spaced a little upwardly from the plane of the sheet mounting member 14 is shown in FIG. 6(A). In the regular up-position of the press roller 44, the press roller arm 40 is out of the path of the engagement body 60 of the line-drafting head 28. When the third eccentric sectional portion is at the contactor 54 and the press roller 44 is raised to the uppermost position relative to the drive rollers 24 as shown in FIG. 6(B), the press roller arm 40 enters the path of the engagement body 60 of the line-drafting head 28. In consequence, when the line-drafting or drawing head 28 travels some distance toward the press roller arm 40 along the rail, the engagement body 60 is prevented from moving past the press roller arm 40 because the arm 40 blocks the body 60, so that the body 60 pushes the arm 40 and the arm 40 is driven along the rail. There are reflection marks 66 and 68 at the ends of the press roller arms 38 and 40 as shown in FIG. 7, and a sensor 70 is provided on the line-drafting head 28 for detecting the reflection marks 66 and 68. The X- and Y-axis motors, the motor 64, the elevator drive apparatus contained in the line-drafting head 28, and sensors 70 and 90, etc. are connected to a controller (not shown) consisting of a calculator.

Figure 8:
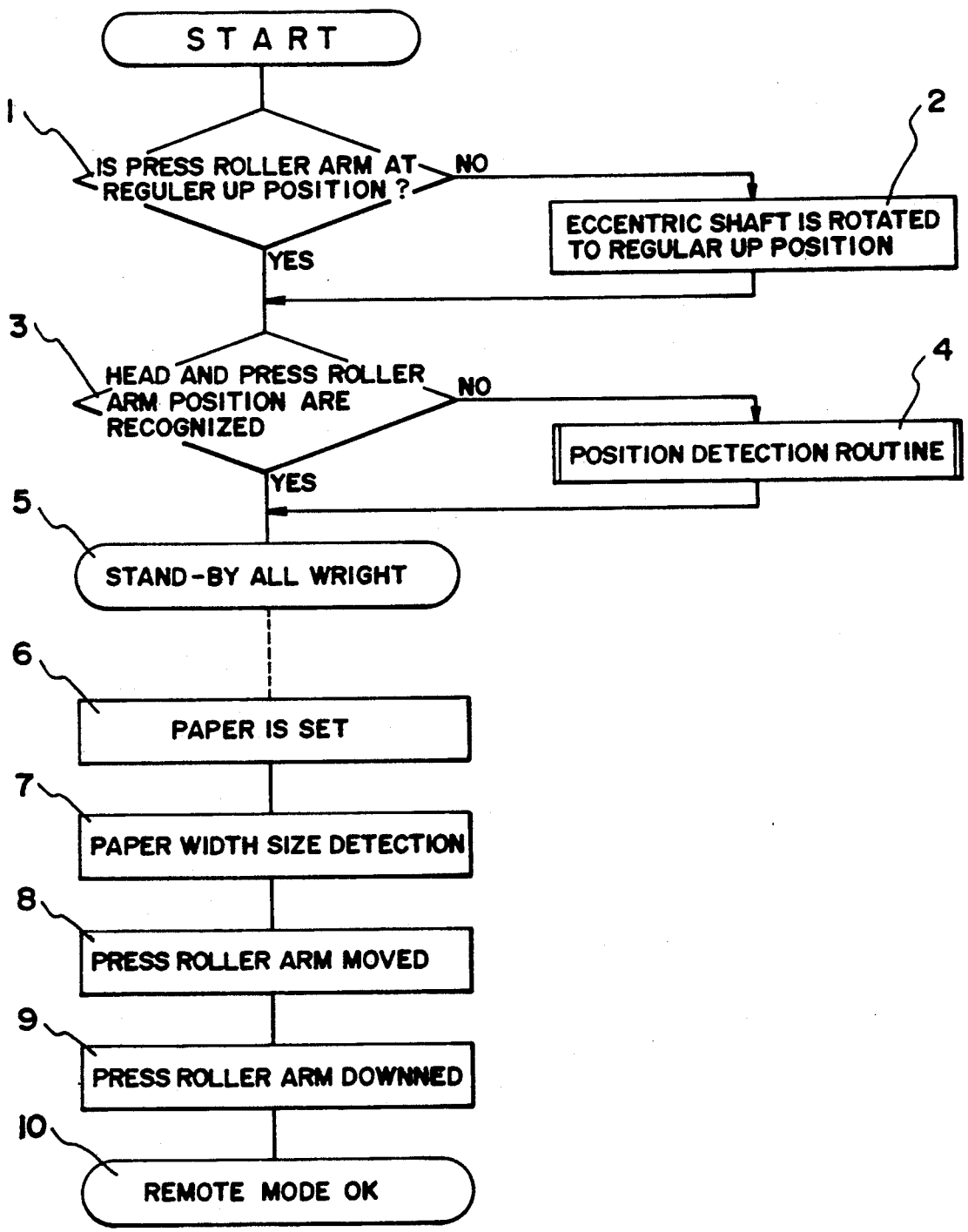
FIG. 8 is a flow chart of the operation of the machine.

The operation of the embodiment of the sheet-driven type automatic drafting machine will now be explained with reference to the flow chart shown in FIG. 8.

First, the controller starts operation and it judges at the judging block or step 1 whether the press roller arms 38 and 40 are at the regular up-position or not, that is, whether the press rollers 42 and 44 are in the position (B) in FIG. 3 or not. If the judgment of the controller is negative, the controller rotates the motor 64 at step 2 in order to rotate the eccentric cam 58 and set the press roller arms 38 and 40 at their regular up-positions. Next, the controller judges in step 3 whether the positions of the line-drafting head 28 and the press roller arm 40 are detected or not. When the judgment is negative, the operation of the controller is transferred to step 4 of position detection. At step 4, the line-drafting head 28 moves toward the stationary press roller arm 38 along the rail and the reflection mark 66 is detected by the sensor 70. The position of the line-drafting head 28 in the Y-axis direction is thus detected using the detected position of the reflection mark 66 as an origin. Next, the controller moves the line-drafting head 28 toward movable press roller arm 40 along the rail and the sensor 70 on the head 28 senses the reflection mark 68, detecting the position of the mark as a position of the press roller arm 40. Thus, a movement preparation step of the press roller arm 40 is completed at step 5. Then, the operator selects the paper sheet cassette 95 storing desired sizes of paper at step 6. As a result, a sheet cassette selection signal is inputted to the controller, the paper sheet 94 in the selected cassette 95 is sent onto the sheet mounting member 14 through the automatic sheet supply mechanism 97, and the sheet is inserted automatically between the drive rollers 24 and the press rollers 42 and 44. When the automatic sheer supply mechanism 97 is not used in the drafting machine according to the present invention, the operator manually places a sheet 94 on the sheet mounting member 14 with the left edge of the sheet against the sheet restriction member 92 and then the sheet is inserted between the drive rollers 24 and the press rollers 42 and 44. At the next step 7, the controller detects the width size of the sheet 94 from an output signal of the sheet width size detection sensor 90 or a sheet cassette selection signal. Anyway, it is possible to make the controller detect the width size of a sneer 94 by inputting a width size through the operating panel on the controller.

The controller outputs a press roller arm travelling command to the Y-axis motor according to the width of the sheet 94 in order to move the line-drafting head 28 along the rail and place the engagement body 60 at one of the sides of the press roller, in which position the engagement body can push the press roller arm 40. Next, the controller raises the press roller arm 40 to the uppermost position as shown in FIG. 6(B). In addition, the line-drafting head 28 is moved along the rail on the basis of the press roller arm travelling command from the controller, so that the press roller arm 40 is pushed by the engagement body 60 and moves along the shaft 36. When the press roller arm 40 reaches the predetermined position, the line-drafting head 28 stops, thereby completing the positioning of the press roller arm 40 (see step 8). As a result, the press roller 44 on arm 40 moves to the right and is placed above the opening 16 at the most suitable position of the sheet mounting member 14 according to the particular size of the sheer and over the drive roller 24 within the opening 16. Thus, the distance between the press roller arm 38 ar the fixed position and the movable press roller arm 40 can be automatically controlled corresponding to the size of the width of the sheer 94. It is possible to receive a press roller arm motion command from the host computer so as to correspond to the sheet size used in place of the system in which the controller detects the sheet width size by a sheet cassette selection signal, a sheet width size input from the operation panel, and output signals from the sheet width size detection sensor 90. When the press roller arm 40 is pushed along the shaft 36, there is substantially no friction force between the contactor 54 and the eccentric cam 58 since the contactor 54 contacts the eccentric cam 58 only under the effect of the weight of the weight 48, so it is possible to move the press roller arm 40 smoothly along the shaft 36 with a light force. Next, at step 9, the controller drives the motor 64 to rotate the eccentric cam 58 and the press roller arms 38 and 40 are set at their lowest positions, so that the sheet is nipped between the drive rollers 24 and the press rollers 42 and 44 by the resilient force of the spring 56. The preparation for drafting is thus over and the controller is moved to step 10 of a remote mode. In order to carry out a drafting operation, the controller drives the X-axis motor and the drive rollers 24 in a reciprocal or reversible manner, the drafting roller 26 cooperates the drive motors 24 and they rotate in the same direction. The Y-axis motor drives the line-drafting head 28 along the rail and the pen holder 32 is controllably elevated, and thus the drafting instrument 34 is applied to and separated from the sheet on the drafting roller 26 in order to draw the predetermined patterns on the paper sheet.

Figure 9:
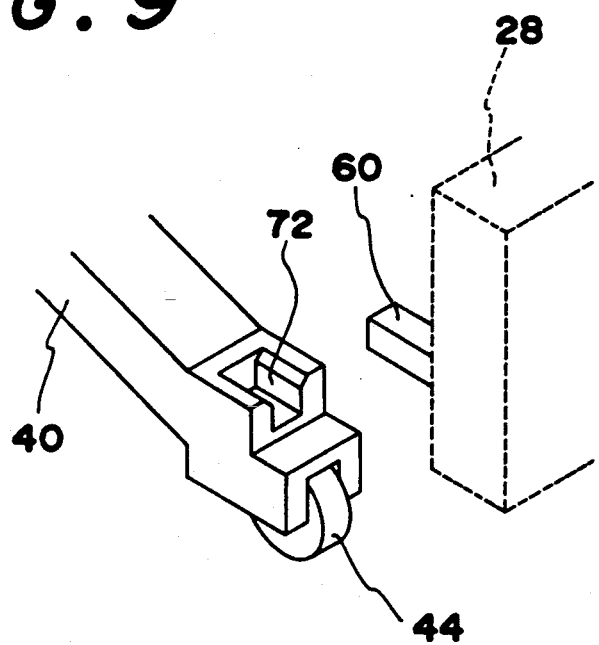
FIG. 9 is a perspective view of another embodiment of the machine according to the present invention.

According to the embodiment of the automatic drafting machine, the engagement body 60 on the line-drafting head 28 is adapted to push the side of the press roller arm 40. However, it is possible to alter the structure to have, as shown in FIG. 9, a groove 72 in the upper surface of the front end of the movable press roller arm 40, into which groove 72 the engagement body 60 of the line-drafting head 28 is inserted. The engagement body 60 is placed just above the groove 72, and when the press roller arm 40 is raised from its regular up-position to the uppermost up-position, the groove 72 is moved up around the engagement body 60. By constructing or using the groove 72 in order to change the direction of movement of the press roller arm 40 transversely in the Y-axis direction, it is not necessary to raise or lower the press roller arm 40 and slide it horizontally and then lower or raise it to change the side of the press roller arm 40 with which the engagement body contacts from one to the other side of the press roller arm 40.

Figure 10:
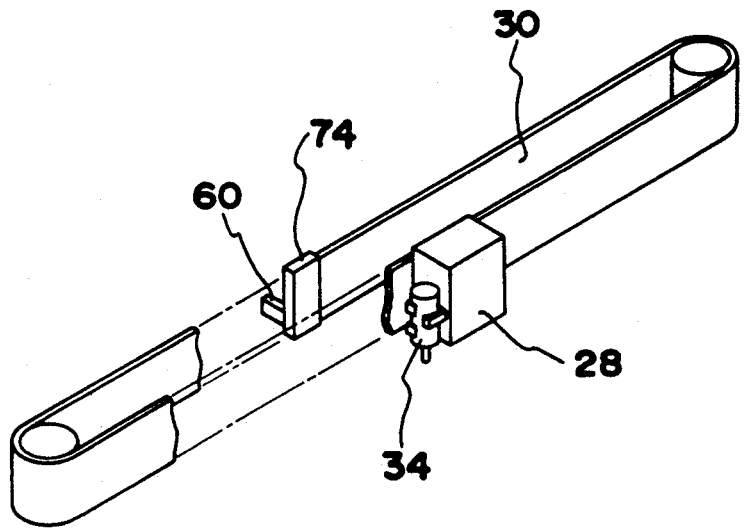
FIG. 10 is a perspective view of still another embodiment.
Figure 11:
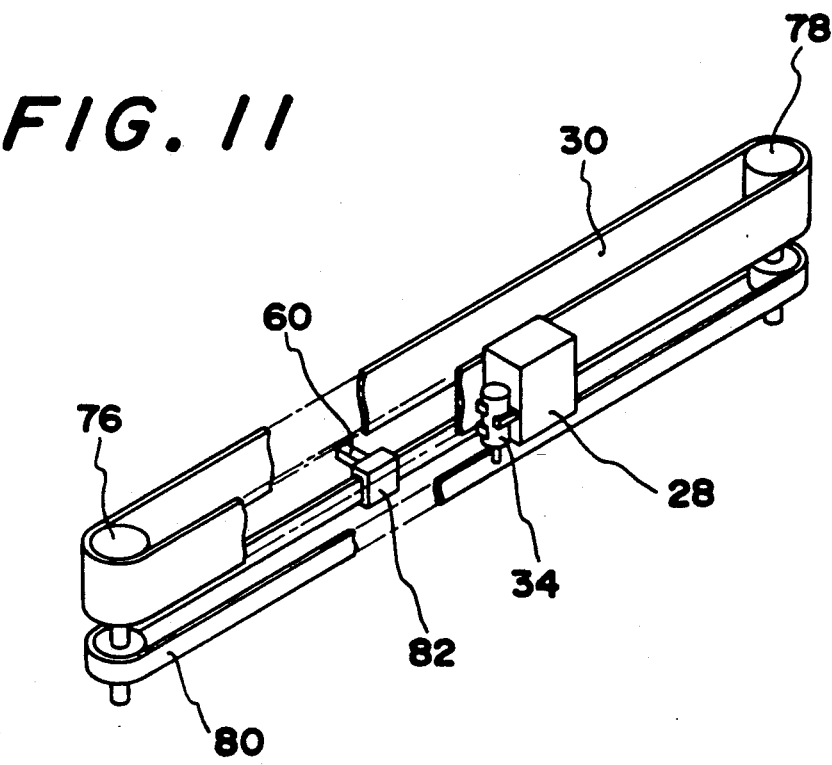
FIG. 11 is a perspective view of still another embodiment.
Figure 12A:
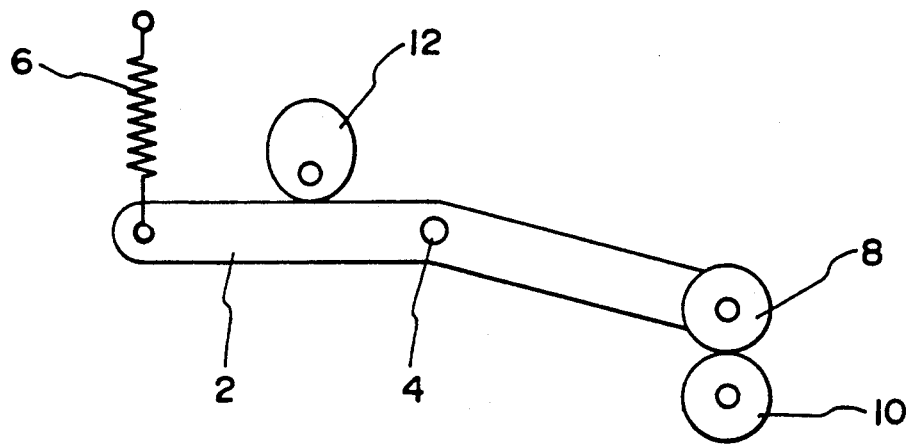
FIGS. 12(A) and 12(B) are views of the press roller supporting arm according to the prior art.
Figure 12B:
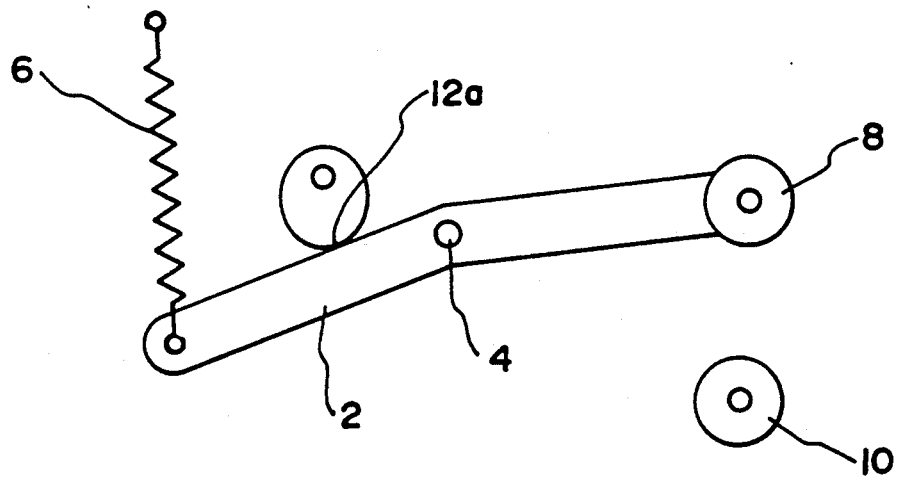

It is noted that the construction of the engagement body 60 for moving the press roller arm 40 is not limited to mounting it on the line-drafting head 28; it is possible to mount the engagement body 60 for the press roller arm movement on a cursor 74 connected to the belt 30 as shown in FIG. 10. It is also possible as shown in FIG. 11 to run the endless belt 80 for moving the cursor around each of the shafts of the pulleys 76 and 78 of the belt 30, so as to make these belts cooperate. The cursor 82 is connected to the endless belt 80 and the engagement body 60 is mounted on the cursor 82 in order to move the press roller arm according to the embodiment described above. Also, the arm drive mechanism is not restricted to that in which the press roller arm 40 is driven by the engagement body 60 moved in cooperation with the line-drafting head 28.

FIGS. 13 and 14 show an embodiment of the drafing machine which differs from the above-described embodiments in that it has a drive roller means in the form of a single drive roller 27 and a slightly different drive for the movable press roller arm.

Instead of a plurality of openings 16 and a plurality of rollers 24, as in the above embodiments, the present embodiment has opening means in the form of a single opening 15 in sheet mounting member 14, driven in the same manner as drive rollers 24 of FIGS. 1-4. This arrangement is also usable in the above-described embodiments as well as in the present embodiment.

The drive for the movable press roller arm, here the left-hand arm 38, has a shaft 96 rotatably mounted on a machine frame (not shown) of the drafting machine according to the present invention. A shaft 97 is provided on the machine frame in parallel with the shaft 96 in order to prevent shaft 96 from rotating cursors 104 and 106 mounted on shafts 96 and 97. The shaft 96 has a threaded portion 96a and a non-threaded portion 96b, respectively formed thereon. The threaded portion 96a of shaft 96 is threadedly engaged in a threaded hole 112 of cursor 104, and nonthreaded portion 96b extends through threaded hole 114 of the cursor 106. The shaft 97 is inserted through holes of the cursors 104 and 106 which have linear ball-bearings 105 therein, so that these cursors 104 and 106 can move or slide along the shaft 97. Shaft 96 is driven to rotate by motor 98 through gears 100 and 102.

When the shaft 96 is rotated by the motor 98, cursor 104 moves along the shaft 96 while the other cursor 106 remains fixed.

As a result, when a paper sheet is to be set in the machine, an operator holds the sheet so as to match the right side of the sheet with the right pressing roller 44 and places the sheet on the drive roller 27. The cursor 106 is used as a standard point and it is not necessary to move it along the shaft 96, so that it would be sufficient to make the threaded hole 114 an unthreaded hole. However, in order to reduce the cost of the drafting machine, the hole 114 of the cursor 106 is made the same as that of the cursor 104 so that only one form of cursor need be made.

The press roller arms 38 and 40, which are the same as in the above-described embodiments, respectively have projections 108 and 110 secured thereon, and engage downwardly facing recesses 108a and 110a in cursors 104 and 106. It is noted that the respective protrusions 108 and 110 are movable a predetermined vertical distance in the recesses in cursors 104 and 106, whereby the pressing rollers 42 and 44 can move up and down together upon up and down movement of the arms 38 and 40.

In operation, with the pressing rollers 42 and 44 raised, the operator places the right side of the sheet at the pressing roller 44, and sets the sheet on the single drive roller 27. Then, a controller drives the motor 98 on the basis of an output signal from a sheet width or size detection sensor 90 in sheet mounting member 14, or a sheet width signal from an operating board, or a command from a host computer. A driving force from the motor 98 is applied to the shaft 96 through the pair of gears 100 and 102, and the pressing roller arm 38 is moved along the shaft 96 by rotation of the shaft 96. When the pressing roller 42 reaches the predetermined position corresponding to the particular sheet width size, the motor 98 stops. When the pressing rollers 42 and 44 are lowered, the paper sheet placed on the drive roller 27 is held by the pressing rollers 42 and 44 at both sides of the sheet.

In the embodiment shown in FIG. 1, the fixed arm 38 and pressing roller 42 are at the left side of the apparatus, so that an operator places the left side of the paper sheet 94 at the left pressing roller 42. The operator can optionally select, during positioning of the sheet 94, the right pressing roller or the left pressing roller as a standard for the positioning.

According to the sheet-driven type automatic drafting machine of the present invention, it is possible to control the distance between press rollers as described above automatically, i.e. to automatically move the press rollers in their most suitable positions on the basis of the sheet cassette selection signal or a selected signal of sheet width size. As a result, it is possible to select or determine the sheet at random or freely and to smoothly or effectively move the press rollers of the automatic drafting machine.

What is claimed is:

1. A sheet-driven type automatic drafting machine, comprising:
   a sheet mounting member having opening means therein along a line in a Y axis direction of said machine;
   drive roller means positioned in said opening means in said sheet mounting member, and a rotary drive mechanism connected to said drive roller means;

a Y axis rail extending in the Y axis direction above said sheet mounting member;

a line drafting head movably mounted on said rail for movement along said rail and means connected to said head for driving said head along said rail;

a shaft positioned above said sheet mounting member adjacent and parallel to said rail;

a first press roller arm pivotally mounted on said shaft for pivoting movement around said shaft at a predetermined position thereon;

a second press roller arm pivotally mounted on said shaft for pivoting movement around said shaft and for movement along said shaft;

said press roller arms each having a press roller at one end thereof engagable with a corresponding part of said drive roller means when said press roller arms are pivoted to move said one end toward said sheet mounting member for pressing a drafting sheet therebetween and enabling the drafting sheet to be driven in an X axis direction by said drive roller means;

arm elevating means engaged with said arms for pivotally driving said arms for separating said press rollers from said drive roller means;

a cursor movable along said Y axis rail and driven by said head driving means with said drafting head; and an arm drive engagement body on said cursor engagable with said second press roller arm for driving said second press roller arm along said shaft in the Y axis direction.

2. A sheet-driven type automatic drafting machine as claimed in claim 1 in which said opening means comprise a plurality of openings and said drive roller means comprise a plurality of drive rollers, one in each opening.

3. A sheet-driven type automatic drafting machine as claimed in claim 1 in which said opening means comprises a single elongated opening and said drive roller means comprises a single roller in said elongated opening extending along the opening.

4. A sheet-driven type automatic drafting machine, comprising:

a sheet mounting member having opening means therein along a line in a Y axis direction of said machine;

drive roller means positioned in said opening means in said sheet mounting member, and a rotary drive mechanism connected to said drive roller means;

a Y axis rail extending in the Y axis direction above said sheet mounting member;

a line drafting head movably mounted on said rail for movement along said rail and means connected to said head for driving said head along said rail;

a shaft positioned above said sheet mounting member adjacent and parallel to said rail;

a first press roller arm pivotally mounted on said shaft for pivoting movement around said shaft at a predetermined position thereon;

a second press roller arm pivotally mounted on said shaft for pivoting movement around said shaft and for movement along said shaft;

an arm drive mechanism movable along said Y-axis rail and engagable with said second press roller arm for driving said second press roller arm along said shaft in the Y axis direction;

said press roller arms each having a press roller at one end thereof engagable with said drive roller means when said press roller arms are pivoted to move said one ends toward said sheet mounting member for pressing a drafting sheet therebetween and enabling the drafting sheet to be driven in an X axis direction by said drive roller means; and arm elevating means engaged with said arms for pivotally driving said arms for separating said press rollers from said drive roller means, said arm elevating means having an eccentric cam positioned under the end of said roller arms on the opposite side of said shaft from the ends having said press rollers thereon, and contactor means on the end of each of said roller arms adjacent said cam, including a spring means urging the contactor means toward said cam, and means engaged with the corresponding arm for applying a weak force to the arm for pivoting the arm in a direction to move the press roller away from the drive roller means, said eccentric cam having a shape for, when the least eccentric portion in opposite said contactor means, said roller arm pivots under said weak force to move the contactor means into engagement with said cam under said weak force, and the press roller is separated from the drive roller means, and when the most eccentric part of said cam is opposite said contactor means, said cam engages said contactor means to pivot the roller arm to move the press roller to engage the corresponding drive roller under the force of said spring means.

5. A sheet-driven type automatic drafting machine as claimed in claim 4 in which said contactor means comprises a contactor slidable through the end of the corresponding roller arm and said spring means engaged therewith urging the contactor toward said cam.

6. A sheet-driven type automatic drafting machine, comprising:

a sheet mounting member having opening means therein along a line in a Y axis direction of said machine;

drive roller means positioned in said opening means in said sheet mounting member, and a rotary drive mechanism connected to said drive roller means;

a Y axis rail extending in the Y axis direction above said sheet mounting member;

a line drafting head movably mounted on said rail for movement along said rail and means connected to said head for driving said head along said rail;

a shaft positioned above said sheet mounting member adjacent and parallel to said rail;

a first press roller arm pivotally mounted on said shaft for pivoting movement around said shaft at a predetermined position thereon;

a second press roller arm pivotally mounted on said shaft for pivoting movement around said shaft;

said press roller arms each having a press roller at one end thereof engagable with said drive roller means when said press roller arms are pivoted to move said one ends toward said sheet mounting member for pressing a drafting sheet therebetween and enabling the drafting sheet to be driven in an X axis direction by said drive roller means; and arm elevating means engaged with said arms for pivotally driving said arms for separating said press rollers from said drive roller means, said arm elevating means having an eccentric cam positioned under the end of said roller arms on the opposite side of said shaft from the ends having said press rollers thereon, and contactor means on the end of each of said roller arms adjacent said cam, including a spring means urging the contactor means toward said cam, and means engaged with the corresponding arm for applying a weak force to the arm for pivoting the arm in a direction to move the press roller away from the drive roller means, said eccentric cam having a shape for, when the least eccentric portion is opposite said contactor means, said roller arm pivots under said weak force to move the contactor means into engagement with said cam under said weak force, and the press roller is separated from the drive roller means, and when the most eccentric part of said cam is opposite said contactor means, said cam engages said contactor means to pivot the roller arm to move the press roller to engage the drive roller means under the force of said spring means.

7. A sheet-driven type automatic drafting machine, comprising:

a sheet mounting member having opening means therein along a line in a Y axis direction of said machine;

drive roller means positioned in said opening means in said sheet mounting member, and a rotary drive mechanism connected to said drive roller means;

a Y axis rail extending in the Y axis direction above said sheet mounting member;

a line drafting head movably mounted on said rail for movement along said rail and means connected to said head for driving said head along said rail;

a shaft positioned above said sheet mounting member adjacent and parallel to said rail;

a first press roller arm pivotally mounted on said shaft for pivoting movement around said shaft at a predetermined position thereon;

a second press roller arm pivotally mounted on said shaft for pivoting movement around said shaft and for movement along said shaft;

said press roller arms each having a press roller at one end thereof engagable with a corresponding part of said drive roller means when said press roller arms are pivoted to move said one end toward said sheet mounting member for pressing a drafting sheet therebetween and enabling the drafting sheet to be driven in an X axis direction by said drive roller means;

arm elevating means engaged with said arms for pivotally driving said arms for separating said press rollers from said drive roller means;

a cursor corresponding to said second press roller arm being mounted for movement along a fixed path in said Y axis direction above said drive roller means;

cursor drive means connected to said movable cursor for moving said movable cursor in said Y axis direction;

said movable cursor having an engaging means on a bottom surface thereof and said second press roller arm having a complementary engaging means on the upper surface thereof engaging in said engaging means when said second press roller arm is separated from said drive roller means for being moved along said drive roller means when said cursor drive means is operated.

8. A sheet-driven automatic drafting machine as claimed in claim 7 in which said engaging means is a recess, and said complementary engaging means is a projection.

9. A sheet-driven type automatic drafting machine as claimed in claim 7 in which said opening means comprise a plurality of openings and said drive roller means comprise a plurality of drive rollers, one in each opening.

10. A sheet-driven type automatic drafting machine as claimed in claim 7 in which said opening means comprises a single elongated opening and said drive roller means comprises a single roller in said elongated opening extending along the opening.

* * * * *